US012305525B1

(12) United States Patent
Thomas et al.

(10) Patent No.: US 12,305,525 B1
(45) Date of Patent: May 20, 2025

(54) TURBINE SHROUD ASSEMBLIES WITH ROD SEAL AND STRIP SEALS

(71) Applicant: Rolls-Royce Corporation, Indianapolis, IN (US)

(72) Inventors: David J. Thomas, Indianapolis, IN (US); Aaron D. Sippel, Indianapolis, IN (US); Ted J. Freeman, Indianapolis, IN (US); Clark J. Snyder, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/678,889

(22) Filed: May 30, 2024

(51) Int. Cl.
*F01D 11/00* (2006.01)
*F01D 25/24* (2006.01)

(52) U.S. Cl.
CPC .......... *F01D 25/246* (2013.01); *F01D 11/003* (2013.01); *F01D 11/005* (2013.01); *F05D 2230/60* (2013.01); *F05D 2240/11* (2013.01); *F05D 2260/96* (2013.01)

(58) Field of Classification Search
CPC ...... F01D 11/005; F01D 11/08; F01D 25/246; F05D 2240/11
See application file for complete search history.

(56) References Cited

U.S. PATENT DOCUMENTS 7,207,771 B2 4/2007 Synnott et al.
7,217,089 B2 5/2007 Durocher et al.
7,374,395 B2 5/2008 Durocher et al.
7,513,740 B1 4/2009 Hervy et al.
7,600,967 B2 10/2009 Pezzetti, Jr. et al.
7,771,159 B2 8/2010 Johnson et al.
7,901,186 B2 3/2011 Cornett et al.
8,206,087 B2 6/2012 Campbell et al.
8,303,245 B2 11/2012 Foster et al.
8,641,371 B2 2/2014 Nakamura et al.
8,651,497 B2 2/2014 Tholen et al.
8,684,680 B2 4/2014 Martin et al.
8,784,041 B2 7/2014 Durocher et al.
8,845,285 B2 9/2014 Weber et al.
8,905,708 B2 12/2014 Weber et al.
9,079,245 B2 7/2015 Durocher et al.
9,534,500 B2 1/2017 Bouchard et al.
9,708,922 B1 7/2017 Davis et al.
9,714,580 B2 7/2017 Slavens et al.
(Continued)

FOREIGN PATENT DOCUMENTS

EP 1965031 A2 9/2008
EP 3543468 A1 9/2019
FR 3056636 A1 3/2018

*Primary Examiner* — Justin D Seabe
(74) *Attorney, Agent, or Firm* — Barnes & Thornburg

(57) ABSTRACT

A turbine shroud assembly includes a first shroud segment, a second shroud segment, and a plurality of seals. The first shroud segment includes a first carrier segment arranged circumferentially at least partway around a central axis and a first blade track segment supported by the first carrier segment. The second shroud segment is arranged circumferentially adjacent the first shroud segment about the central axis. The plurality of seals extend circumferentially into the first shroud segment and the second shroud segment to block gases from escaping the gas path radially between the first shroud segment and the second shroud segment.

18 Claims, 6 Drawing Sheets

(56) References Cited

U.S. PATENT DOCUMENTS

| | | | |
|---|---|---|---|
| 9,745,854 | B2 | 8/2017 | Baldiga et al. |
| 9,759,079 | B2 | 9/2017 | Sippel et al. |
| 9,863,265 | B2 | 1/2018 | Stapleton |
| 9,863,323 | B2 | 1/2018 | Kirtley et al. |
| 9,869,201 | B2 | 1/2018 | Dyson et al. |
| 9,874,104 | B2 | 1/2018 | Shapiro |
| 9,915,162 | B2 | 3/2018 | Duguay |
| 9,945,484 | B2 | 4/2018 | Moehrle et al. |
| 9,957,827 | B2 | 5/2018 | Davis et al. |
| 9,982,550 | B2 | 5/2018 | Davis |
| 9,988,919 | B2 | 6/2018 | Davis et al. |
| 9,988,923 | B2 | 6/2018 | Snyder et al. |
| 10,012,099 | B2 | 7/2018 | Cetel et al. |
| 10,024,193 | B2 | 7/2018 | Shapiro |
| 10,072,517 | B2 | 9/2018 | Boeke et al. |
| 10,082,085 | B2 | 9/2018 | Thomas et al. |
| 10,087,771 | B2 | 10/2018 | Mcgarrah |
| 10,100,660 | B2 | 10/2018 | Sippel et al. |
| 10,132,197 | B2 | 11/2018 | Heitman et al. |
| 10,138,747 | B2 | 11/2018 | Dev et al. |
| 10,138,750 | B2 | 11/2018 | Mccaffrey et al. |
| 10,167,957 | B2 | 1/2019 | Davis et al. |
| 10,202,863 | B2 | 2/2019 | Davis et al. |
| 10,265,806 | B2 | 4/2019 | Cui et al. |
| 10,281,045 | B2 | 5/2019 | Sippel et al. |
| 10,301,955 | B2 | 5/2019 | Vetters et al. |
| 10,301,960 | B2 | 5/2019 | Stapleton et al. |
| 10,378,385 | B2 | 8/2019 | Tesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,428,953 | B2 | 10/2019 | Lutjen et al. |
| 10,443,419 | B2 | 10/2019 | Thomas et al. |
| 10,443,420 | B2 * | 10/2019 | Sippel .................... F16J 15/062 |
| 10,465,545 | B2 | 11/2019 | Cetel et al. |
| 10,533,446 | B2 | 1/2020 | Barak et al. |
| 10,550,706 | B2 | 2/2020 | Lutjen et al. |
| 10,577,963 | B2 | 3/2020 | Mccaffrey |
| 10,577,977 | B2 | 3/2020 | Baucco |
| 10,584,605 | B2 | 3/2020 | Sippel et al. |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,633,994 | B2 | 4/2020 | Barker |
| 10,648,362 | B2 | 5/2020 | Groves, II et al. |
| 10,655,495 | B2 | 5/2020 | Groves, II et al. |
| 10,655,501 | B2 | 5/2020 | Lepretre et al. |
| 10,662,794 | B2 | 5/2020 | Das |
| 10,689,998 | B2 | 6/2020 | Stapleton et al. |
| 10,690,007 | B2 | 6/2020 | Quennehen et al. |
| 10,704,404 | B2 | 7/2020 | Shi et al. |
| 10,718,226 | B2 * | 7/2020 | Vetters .................. F01D 25/005 |
| 10,724,399 | B2 | 7/2020 | Carlin et al. |
| 10,731,494 | B2 | 8/2020 | Dev et al. |
| 10,731,509 | B2 | 8/2020 | Correia et al. |
| 10,738,643 | B2 | 8/2020 | Mccaffrey et al. |
| 10,753,221 | B2 | 8/2020 | Barker et al. |
| 10,787,924 | B2 | 9/2020 | Quennehen et al. |
| 10,794,204 | B2 | 10/2020 | Fitzpatrick et al. |
| 10,801,345 | B2 | 10/2020 | Clum et al. |
| 10,801,347 | B2 * | 10/2020 | Joo ....................... F01D 11/005 |
| 10,801,349 | B2 | 10/2020 | Mccaffrey |
| 10,815,807 | B2 | 10/2020 | Vantassel et al. |
| 10,815,810 | B2 | 10/2020 | Barker et al. |
| 10,830,357 | B2 | 11/2020 | Mccaffrey et al. |
| 10,890,079 | B2 | 1/2021 | Propheter-Hinckley et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,934,873 | B2 | 3/2021 | Sarawate et al. |
| 10,968,761 | B2 | 4/2021 | Barker et al. |
| 10,968,777 | B2 | 4/2021 | Propheter-Hinckley et al. |
| 10,982,559 | B2 | 4/2021 | Filippi |
| 11,002,144 | B2 | 5/2021 | Azad et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,066,947 | B2 | 7/2021 | Sippel et al. |
| 11,073,045 | B2 | 7/2021 | Sippel et al. |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,105,215 | B2 | 8/2021 | Roy Thill et al. |
| 11,111,794 | B2 | 9/2021 | Bitzko et al. |
| 11,111,802 | B2 | 9/2021 | Propheter-Hinckley et al. |
| 11,111,822 | B2 | 9/2021 | Tableau et al. |
| 11,111,823 | B2 | 9/2021 | Jarrossay et al. |
| 11,125,096 | B2 | 9/2021 | Clark et al. |
| 11,125,098 | B2 | 9/2021 | Barker et al. |
| 11,143,050 | B2 | 10/2021 | Roy Thill et al. |
| 11,149,574 | B2 | 10/2021 | Laroche |
| 11,174,747 | B2 | 11/2021 | Roy Thill et al. |
| 11,174,795 | B2 | 11/2021 | Lutjen et al. |
| 11,181,006 | B2 | 11/2021 | Smoke et al. |
| 11,187,094 | B2 | 11/2021 | Feldmann et al. |
| 11,215,064 | B2 | 1/2022 | Arbona et al. |
| 11,215,065 | B2 | 1/2022 | Starr et al. |
| 11,215,081 | B2 | 1/2022 | Schilling et al. |
| 11,220,925 | B2 * | 1/2022 | Freeman ................. F01D 11/08 |
| 11,248,480 | B2 | 2/2022 | Thirumalai et al. |
| 11,255,208 | B2 | 2/2022 | Clark et al. |
| 11,255,209 | B2 | 2/2022 | Clark et al. |
| 11,286,812 | B1 | 3/2022 | Freeman et al. |
| 11,313,242 | B2 | 4/2022 | Cetel et al. |
| 11,319,827 | B2 | 5/2022 | Clark et al. |
| 11,319,828 | B1 | 5/2022 | Freeman et al. |
| 11,326,463 | B2 | 5/2022 | Blaney et al. |
| 11,326,470 | B2 | 5/2022 | Dyson et al. |
| 11,346,237 | B1 | 5/2022 | Freeman et al. |
| 11,346,251 | B1 | 5/2022 | Freeman et al. |
| 11,365,635 | B2 | 6/2022 | Read et al. |
| 11,441,434 | B2 | 9/2022 | Danis et al. |
| 11,441,441 | B1 * | 9/2022 | Freeman ................. F01D 11/08 |
| 11,466,585 | B2 | 10/2022 | Arbona et al. |
| 11,466,586 | B2 | 10/2022 | Sippel et al. |
| 11,499,444 | B1 | 11/2022 | Freeman et al. |
| 11,506,085 | B2 | 11/2022 | Jarrossay et al. |
| 11,542,825 | B2 | 1/2023 | Hauswirth et al. |
| 11,542,827 | B2 | 1/2023 | Quennehen et al. |
| 11,624,291 | B2 | 4/2023 | Roy Thill et al. |
| 11,624,292 | B2 | 4/2023 | Clark et al. |
| 11,629,607 | B2 | 4/2023 | Freeman et al. |
| 11,643,939 | B2 | 5/2023 | Stoyanov et al. |
| 11,702,948 | B2 | 7/2023 | Hock et al. |
| 11,702,949 | B2 | 7/2023 | Freeman et al. |
| 11,713,694 | B1 | 8/2023 | Freeman et al. |
| 11,732,604 | B1 | 8/2023 | Freeman et al. |
| 11,761,351 | B2 | 9/2023 | Freeman et al. |
| 11,773,751 | B1 | 10/2023 | Freeman et al. |
| 11,781,440 | B2 | 10/2023 | Vincent et al. |
| 11,781,448 | B1 | 10/2023 | Holleran |
| 11,840,930 | B2 | 12/2023 | Propheter-Hinckley et al. |
| 11,840,936 | B1 | 12/2023 | Freeman et al. |
| 11,879,349 | B2 | 1/2024 | Schilling et al. |
| 2023/0184124 | A1 | 6/2023 | Stoyanov et al. |
| 2023/0332506 | A1 | 10/2023 | Freeman et al. |
| 2024/0003267 | A1 | 1/2024 | Cazin et al. |

* cited by examiner

TURBINE SHROUD ASSEMBLIES WITH ROD SEAL AND STRIP SEALS

FIELD OF THE DISCLOSURE

The present disclosure relates generally to turbine shroud assemblies, and more specifically to sealing of turbine shroud assemblies used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds may include sealing elements between segments to block air from leaking through the segments during operation of the gas turbine engine.

SUMMARY

The present disclosure may comprise one or more of the following features and combinations thereof.

A turbine shroud assembly for use with a gas turbine engine may comprise a first shroud segment, a second shroud segment, and a plurality of seals. The first shroud segment may include a first carrier segment arranged circumferentially at least partway around a central axis and a first blade track segment supported by the first carrier segment to define a first portion of a gas path of the turbine shroud assembly. The first blade track segment may have a first shroud wall that extends circumferentially partway around the central axis and a first attachment feature that extends radially outward from the first shroud wall. The first shroud wall may have a first radial outer surface and a first radial inner surface. The first radial outer surface may include a first portion and a second portion that extends radially inward and circumferentially away from the first portion to provide a first chamfered edge of the first shroud wall. The second shroud segment may be arranged circumferentially adjacent the first shroud segment about the central axis. The second shroud segment may include a second carrier segment arranged circumferentially at least partway around the central axis and a second blade track segment supported by the second carrier segment to define a second portion of the gas path of the turbine shroud assembly. The second blade track segment may have a second shroud wall that extends circumferentially partway around the central axis and a second attachment feature that extends radially outward from the second shroud wall. The second shroud wall may have a second radial outer surface and a second radial inner surface. The second radial outer surface may include a first portion and a second portion that extends radially inwardly and circumferentially away from the first portion of the second radial outer surface to provide a second chamfered edge of the second shroud wall.

In some embodiments, the plurality of seals may extend circumferentially into the first shroud segment and the second shroud segment to block gases from escaping the gas path radially between the first shroud segment and the second shroud segment. The plurality of seals may include a strip seal and a rod seal. The strip seal may extend axially along the first portion of the first radial outer surface of the first shroud wall and the first portion of the second radial outer surface of the second shroud wall. The rod seal may be located radially inward of the strip seal and may extend axially along the second portion of the first radial outer surface of the first shroud wall and the second portion of the second radial outer surface of the second shroud wall to block the gases from passing radially between and beyond the first shroud wall and the second shroud wall.

In some embodiments, the rod seal may include an axial segment, a forward radial segment, and an aft radial segment. The axial segment may extend axially between a first end and a second end thereof opposite the first end. The forward radial segment may extend radially outward from the axial segment toward the first carrier segment and the second carrier segment. The aft radial segment may extend radially outward from the axial segment toward the first carrier segment and the second carrier segment. The aft radial segment may be spaced apart axially aft of the forward radial segment. The axial segment may have a semi-circle shaped cross-section when viewed axially.

In some embodiments, the forward radial segment may be coupled with the axial segment axially aft of the first end of the axial segment. The aft radial segment may be coupled with the axial segment axially aft of the forward radial segment and axially forward of the second end of the axial segment. The strip seal may include a body segment, a first radial segment, and a second radial segment. The body segment may extend axially along the first portion of the first radial outer surface of the first shroud wall and the first portion of the second radial outer surface of the second shroud wall between a first end of the body segment and a second end thereof opposite the first end. The first radial segment may be coupled to the first end of the body segment and may extend radially outward from the first end of the body segment into the first carrier segment. The second radial segment may be coupled to the second end of the body segment and may extend radially outward from the second end of the body segment into the first carrier segment.

In some embodiments, the strip seal may be located axially between the forward radial segment of the rod seal and the aft radial segment of the rod seal. The forward radial segment of the rod seal may abut the first radial segment of the strip seal and the aft radial segment of the rod seal may abut the second radial segment of the strip seal such that the first radial segment and the second radial segment of the strip seal cooperate to axially locate the rod seal.

In some embodiments, the first carrier segment may include a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange.

In some embodiments, the plurality of seals may include a damping segment that engages each of the strip seal, the first carrier segment, and the second carrier segment to urge the strip seal radially inward against the first shroud wall and the second shroud wall. The damping segment may be formed to include a first radially-extending portion at a forward end of the damping segment and a second radially-extending portion at an aft end of the damping segment. The first radially-extending portion may extend into a first slot formed in the third flange to engage the third flange and the second radially-extending portion may extend into a second slot formed in the fourth flange to engage the fourth flange.

In some embodiments, the damping segment may be w-shaped and may include a curved intermediate portion that extends between and interconnects the first radially-extending portion and the second radially-extending portion. The strip seal may include a body segment, a first radial segment, and a second radial segment. The body segment may extend axially along the first portion of the first radial outer surface of the first shroud wall and the first portion of the second radial outer surface of the second shroud wall between a first end of the body segment and a second end thereof opposite the first end. The first radial segment may be coupled to the first end of the body segment and may extend radially outward from the first end of the body segment into the first flange of the first carrier segment. The second radial segment may be coupled to the second end of the body segment and may extend radially outward from the second end of the body segment into the second flange of the first carrier segment.

In some embodiments, the rod seal may include an axial segment, a forward radial segment, and an aft radial segment. The axial segment may extend axially between a first end and a second end thereof opposite the first end. The forward radial segment may extend radially outward from the axial segment and is spaced apart from the first end of the axial segment. The aft radial segment may extend radially outward from the axial segment and may be spaced apart from the forward radial segment and the second end of the axial segment. The strip seal may be located axially between the forward radial segment and the aft radial segment such that the rod seal is blocked from axial movement due to engagement of at least one of the forward radial segment and the aft radial segment with the strip seal.

In some embodiments, the first radial outer surface of the first shroud wall may include a third portion that extends circumferentially away from the first portion of the first radial outer surface to locate the first portion of the first radial outer surface circumferentially between the second portion of the first radial outer surface and the third portion of the first radial outer surface. The third portion of the first radial outer surface may be radially spaced apart from the first portion of the first radial outer surface. The second radial outer surface of the second shroud wall may include a third portion that extends circumferentially away from the first portion of the second radial outer surface to locate the first portion of the second radial outer surface circumferentially between the second portion of the second radial outer surface and the third portion of the second radial outer surface. The third portion of the second radial outer surface may be radially spaced apart from the first portion of the second radial outer surface.

According to another aspect of the present disclosure, a turbine shroud assembly for use with a gas turbine engine may comprise a first shroud segment, a second shroud segment, and a plurality of seals. The first shroud segment may include a first carrier segment arranged circumferentially at least partway around a central axis and a first blade track segment supported by the first carrier segment to define a first portion of a gas path of the turbine shroud assembly. The first blade track segment may have a first shroud wall that extends circumferentially partway around the central axis and a first attachment feature that extends radially outward from the first shroud wall. The second shroud segment may be arranged circumferentially adjacent the first shroud segment about the central axis. The second shroud segment may include a second carrier segment arranged circumferentially at least partway around the central axis and a second blade track segment supported by the second carrier segment to define a second portion of the gas path of the turbine shroud assembly. The second blade track segment may have a second shroud wall that extends circumferentially partway around the central axis and a second attachment feature that extends radially outward from the second shroud wall. The plurality of seals may extend circumferentially into the first shroud segment and the second shroud segment. The plurality of seals may include a first seal, a second seal, and a damping segment. The first seal may extend axially along the first shroud wall and the second shroud wall. The second seal may be located radially inward of the first seal and may extend axially along the first shroud wall and the second shroud wall. The damping segment may be located radially outward of the first seal and may engage the first seal, the first carrier segment, and the second carrier segment.

In some embodiments, the second seal may include an axial segment that extends axially between a first end and a second end thereof opposite the first end. The axial segment may have a semi-circle shaped cross-section when viewed axially. The first seal may include a body segment, a first radial segment, and a second radial segment. The body segment may extend axially along the first shroud wall and the second shroud wall between a first end of the body segment and a second end thereof opposite the first end. The first radial segment may be coupled to the first end of the body segment and may extend radially outward from the first end of the body segment into the first carrier segment. The second radial segment may be coupled to the second end of the body segment and may extend radially outward from the second end of the body segment into the first carrier segment.

In some embodiments, the first carrier segment may include a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange. The damping segment may be formed to include a first radially-extending portion at a forward end of the damping segment and a second radially-extending portion at an aft end of the damping segment. The first radially-extending portion may extend into a first slot formed in the third flange to engage the third flange and the second radially-extending portion may extend into a second slot formed in the fourth flange to engage the fourth flange.

In some embodiments, the first seal may include a body segment, a first radial segment, and a second radial segment. The body segment may extend axially along the first shroud wall and the second shroud wall between a first end of the body segment and a second end thereof opposite the first end. The first radial segment may be coupled to the first end of the body segment and may extend radially outward from the first end of the body segment into the first flange of the first carrier segment. The second radial segment may be coupled to the second end of the body segment and may extend radially outward from the second end of the body segment into the second flange of the first carrier segment. The damping segment may engage the body segment of the first seal.

A method of assembling a turbine shroud assembly for use with a gas turbine engine may comprise assembling a first shroud segment by coupling a first blade track segment with a first carrier segment to support the first blade track segment radially inward of the first carrier segment. The first blade track segment may have a first shroud wall and a first attachment feature that extends radially outward from the first shroud wall. The first shroud wall may have a first radial outer surface that includes a first portion and a second portion that extends radially inward and circumferentially away from the first portion. The method may comprise assembling a second shroud segment by coupling a second blade track segment with a second carrier segment to support the second blade track segment radially inward of the second carrier segment. The method may comprise locating a strip seal on the first portion of the first radial outer surface of the first shroud wall. The method may comprise locating a damping segment on a radially outer surface of the strip seal so that the damping segment engages the strip seal and the first carrier segment. The method may comprise locating a rod seal radially inward of the strip seal on the second portion of the first radial outer surface of the first shroud wall.

In some embodiments, the method may comprise locating the strip seal axially between a forward radial segment of the rod seal and an aft radial segment of the rod seal so that the rod seal is blocked from axial movement relative to the strip seal. The method may comprise urging the strip seal radially inward against the first portion of the first radial outer surface of the first shroud wall through engagement of the damping segment with the first carrier segment and urging the rod seal radially inward against the second portion of the first radial outer surface of the first shroud wall through engagement of the damping segment with the strip seal.

These and other features of the present disclosure will become more apparent from the following description of the illustrative embodiments.

DETAILED DESCRIPTION

Figure 1:
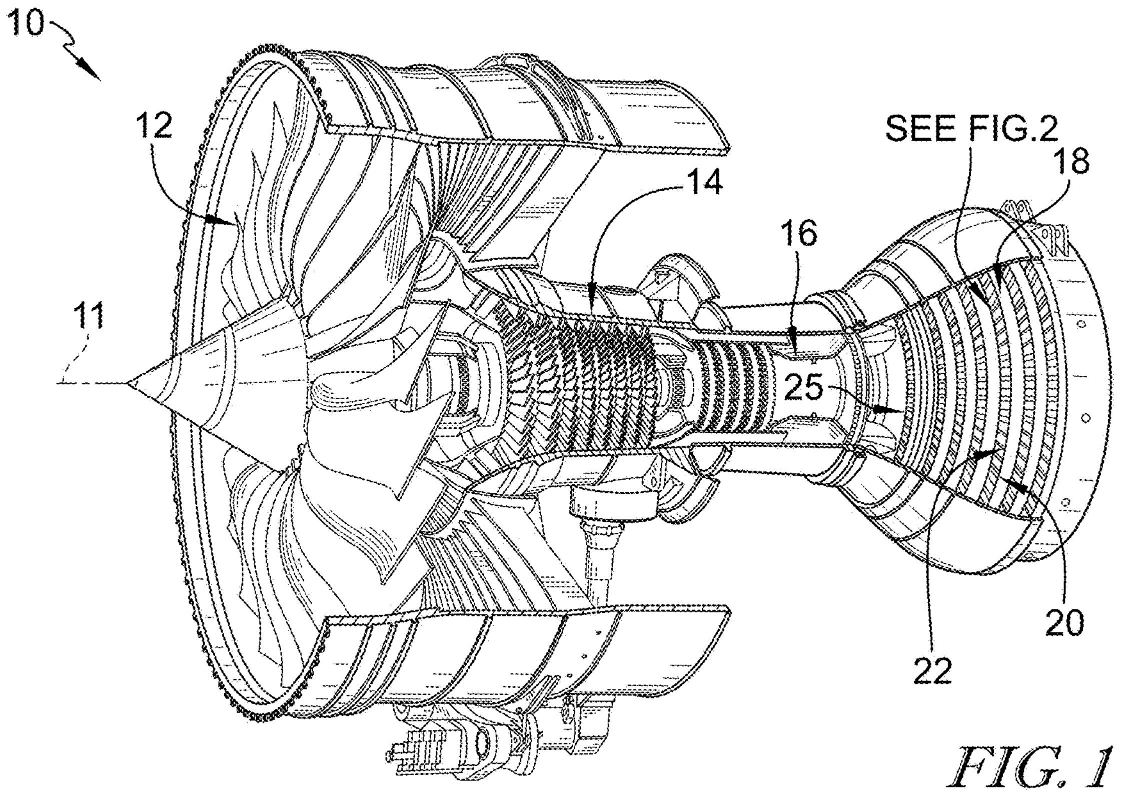
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

Figure 2:
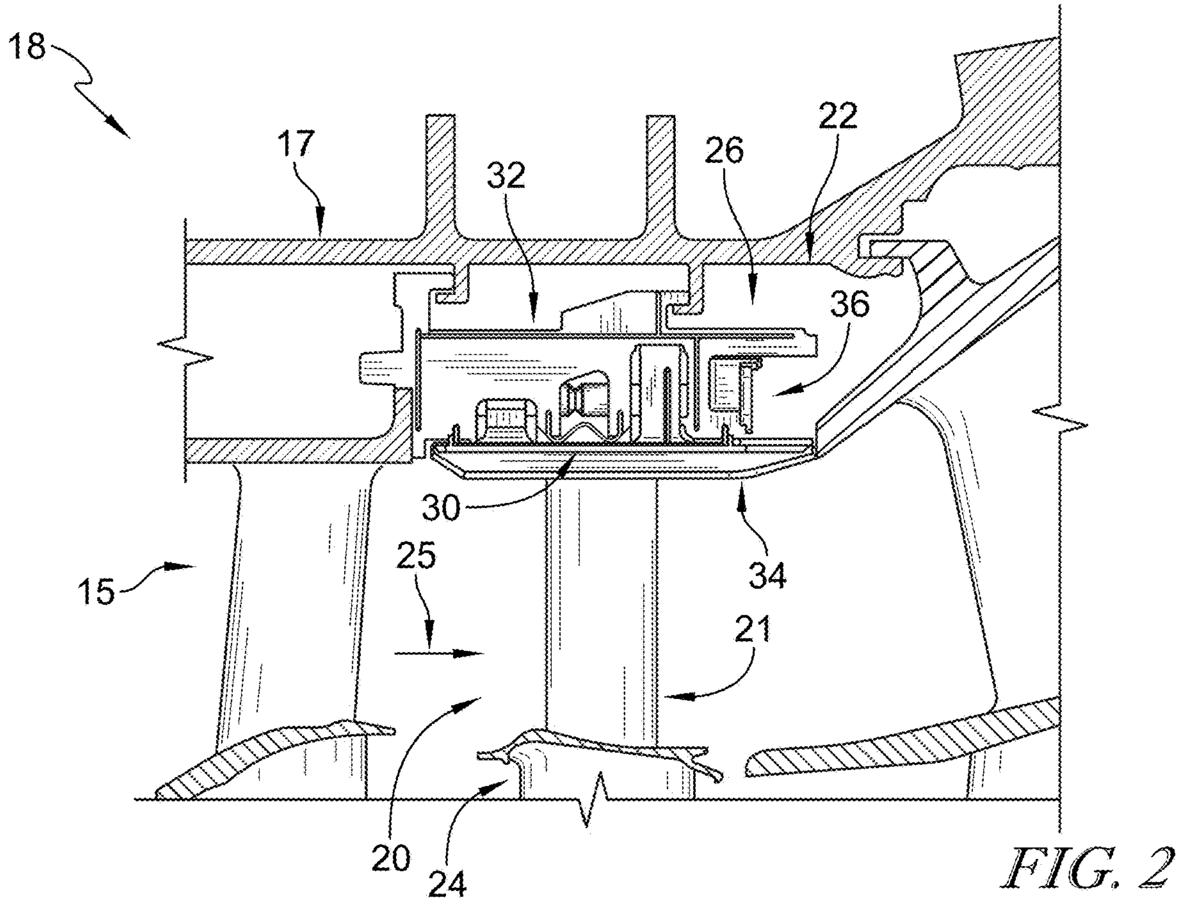
FIG. 2 is a cutaway perspective view of a portion of the turbine shroud assembly of FIG. 1 showing one of the turbine wheel assemblies and a first shroud segment of a plurality of shroud segments arranged around the turbine wheel assembly, the first shroud segment including a first carrier segment, a first blade track segment that defines a portion of a gas path of the turbine, and a first retainer that couples the first blade track segment with the first carrier segment, and further showing that a plurality of seals of the turbine shroud assembly extend circumferentially into the first shroud segment to block gases from passing between the first shroud segment and a circumferentially adjacent second shroud segment.

The turbine 18 includes at least one turbine wheel assembly 20 and a turbine shroud assembly 22 positioned to surround the turbine wheel assembly 20 as shown in FIGS. 1 and 2. The turbine wheel assembly 20 includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud assembly 22 is coupled to an outer case 17 of the gas turbine engine 10 and extends around the turbine wheel assembly 20 to block gases from passing over the blades 21 during use of the turbine 18 in the gas turbine engine 10.

Figure 4:
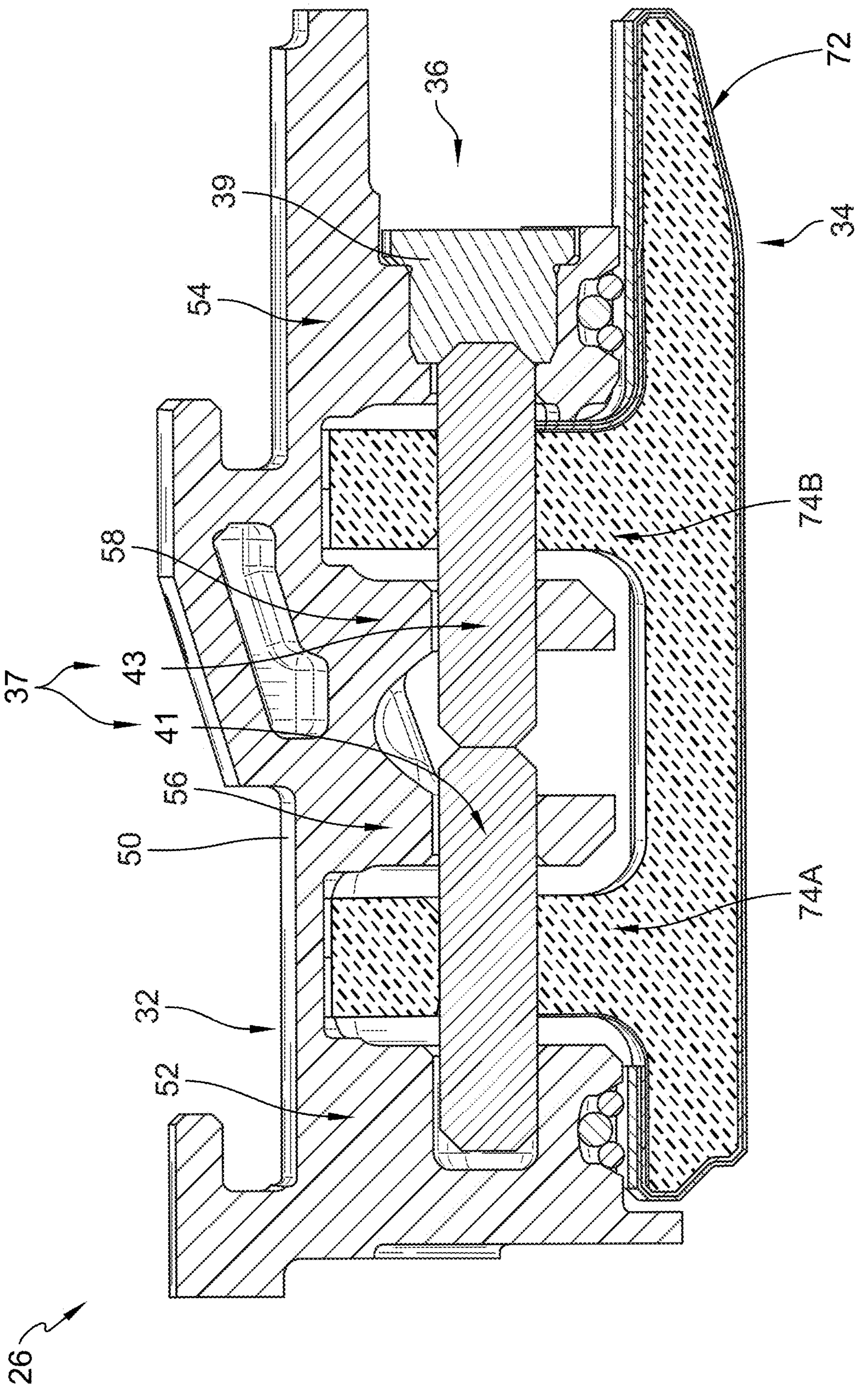
FIG. 4 is a cross-sectional view of the first shroud segment of FIG. 3 showing that the first retainer extends through the first blade track segment and through the first carrier segment to couple the first blade track segment to the first carrier segment.
Figure 5:
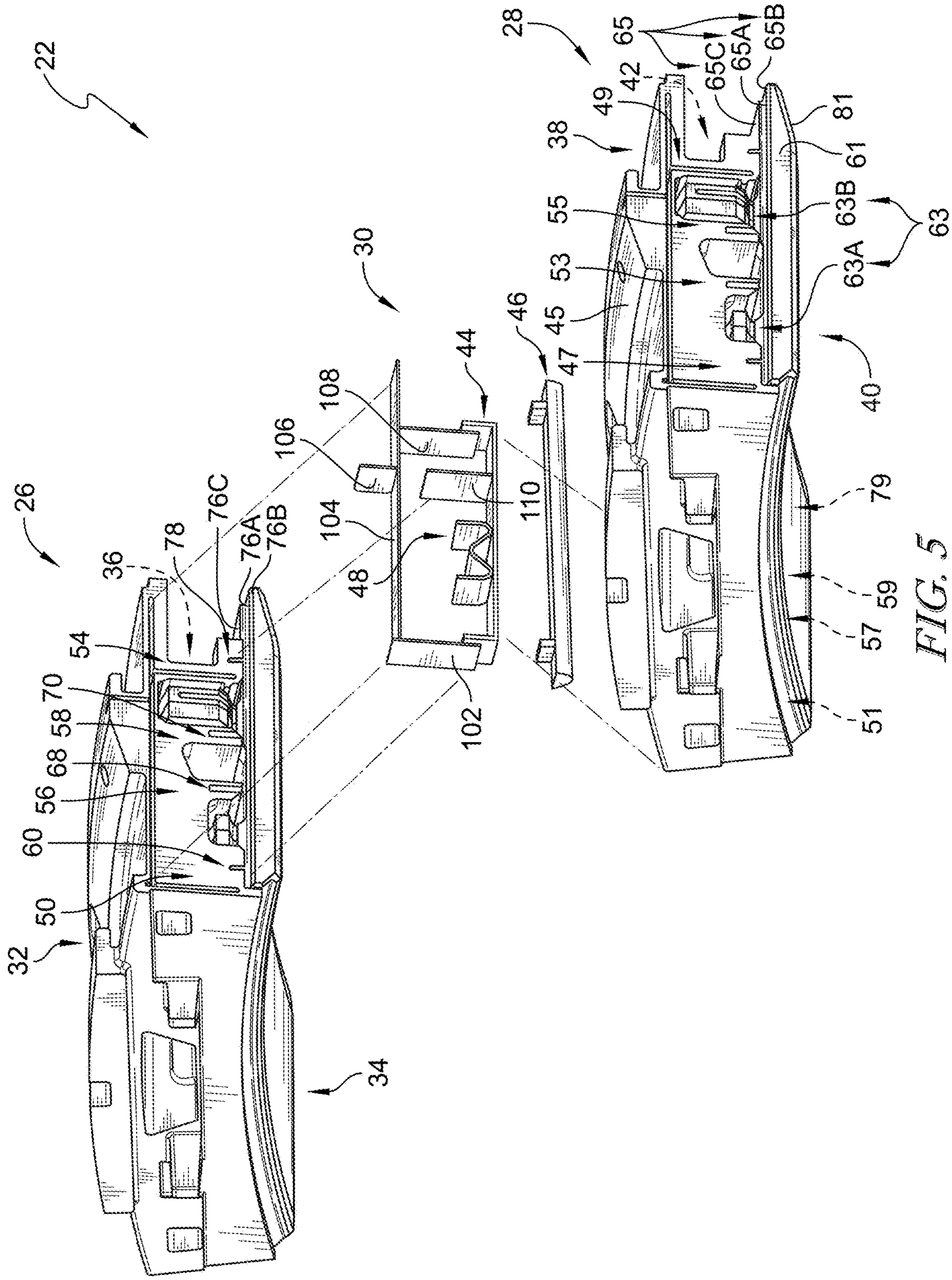
FIG. 5 is an exploded view of the first and second shroud segments used in the gas turbine engine of FIG. 1 showing the first shroud segment and the second shroud segment spaced apart from the first shroud segment, the second shroud segment including a second carrier segment and a second blade track segment supported by the second carrier segment, and further suggesting that the plurality of seals extends circumferentially into the first shroud segment and the second shroud segment to block gases from escaping the gas path radially between the first shroud segment and the second shroud segment.

The turbine shroud assembly 22 includes a plurality of shroud segments and pluralities of seals between adjacent shroud segments as suggested in FIGS. 2 and 5. Of the plurality of shroud segments, a first shroud segment 26 and a second shroud segment 28 are discussed in detail below. Likewise, a plurality of seals 30 included in the pluralities of seals used in the turbine shroud assembly 22 is shown in FIGS. 2-7. The first shroud segment 26, the second shroud segment 28, and the plurality of seals 30 are representative of other adjacent shroud segments and pluralities of seals included in the turbine shroud assembly 22.

Figure 3:
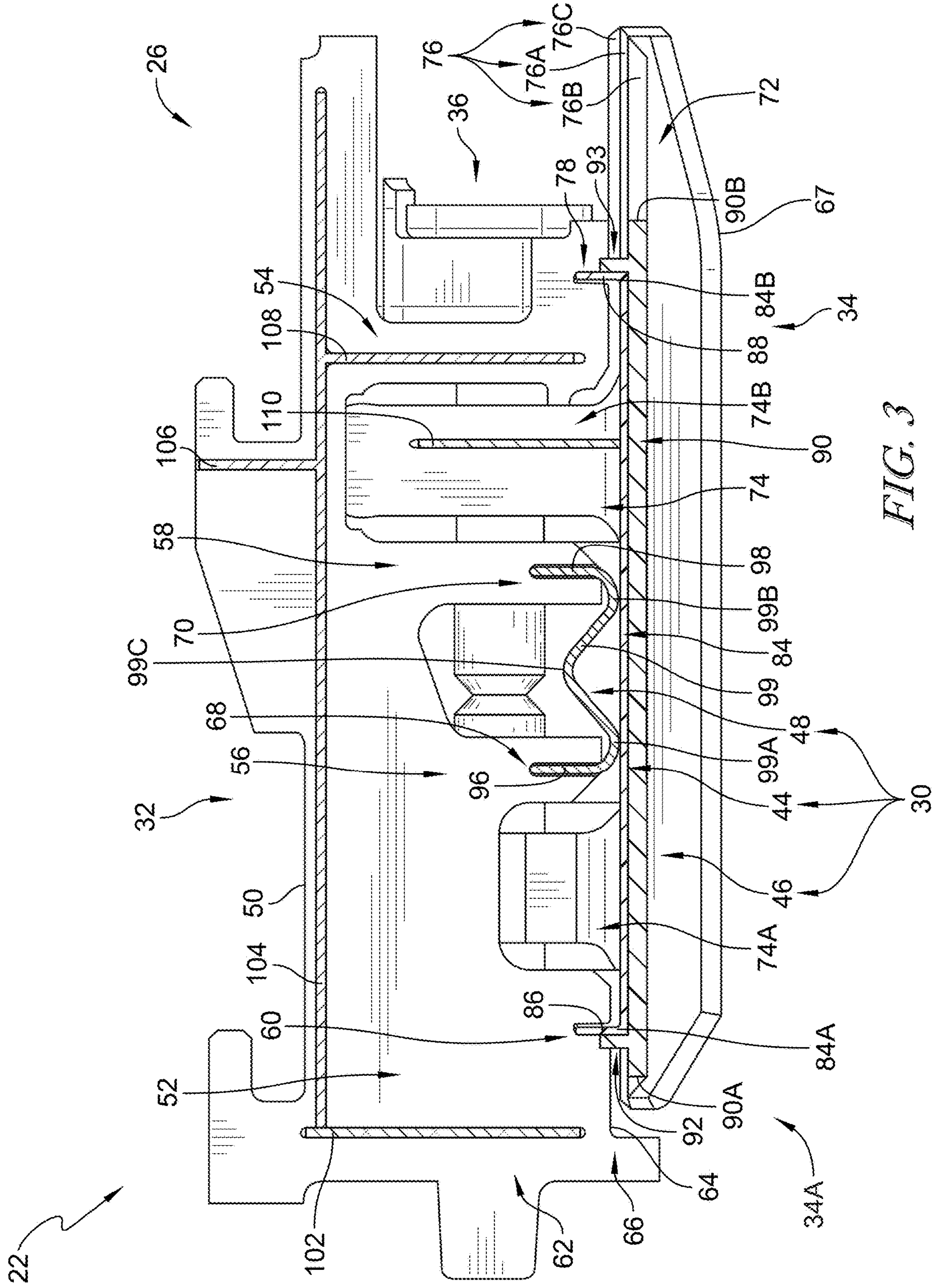
FIG. 3 is a cross-sectional view of the turbine shroud assembly through the plurality of seals of FIG. 2 showing that the first blade track segment has a first shroud wall that extends circumferentially partway around the central axis, the first shroud wall having a first radial outer surface that includes a first portion and a second portion that extends radially inward and circumferentially away from the first portion to provide a first chamfered edge of the first shroud wall, and further showing that the plurality of seals includes a first seal extending axially along the first portion of the first radial outer surface, a second seal located radially inward of the first seal and extending axially along the second portion of the first radial outer surface, and a damping segment located radially outward of the first seal.

The plurality of seals 30 in the illustrative embodiment includes a first seal 44, a second seal 46, and a damping segment 48 as shown in FIG. 3. The first seal 44 and the second seal 46 block gases from the gas path 25 from passing radially between the first shroud segment 26 and the second shroud segment 28. The second seal 46 provides a heat shield for the first seal 44 to protect the first seal 44 from heat of the gases in the gas path 25. The damping segment 48 engages the first seal 44 to urge the first seal 44 radially inwardly against the shroud segments 26, 28 and the second seal 46. In some embodiments, the damping segment 48 is omitted. In some embodiments, the plurality of seals 30 includes strip seals 102, 104, 106, 108, 110 as shown in FIGS. 3 and 5. Any of the strip seals 102, 104, 106, 108, 110 may be included or omitted from the plurality of seals 30. The strip seals 102, 104, 106, 108, 110 are representative of more conventional strip seals.

Figure 7:
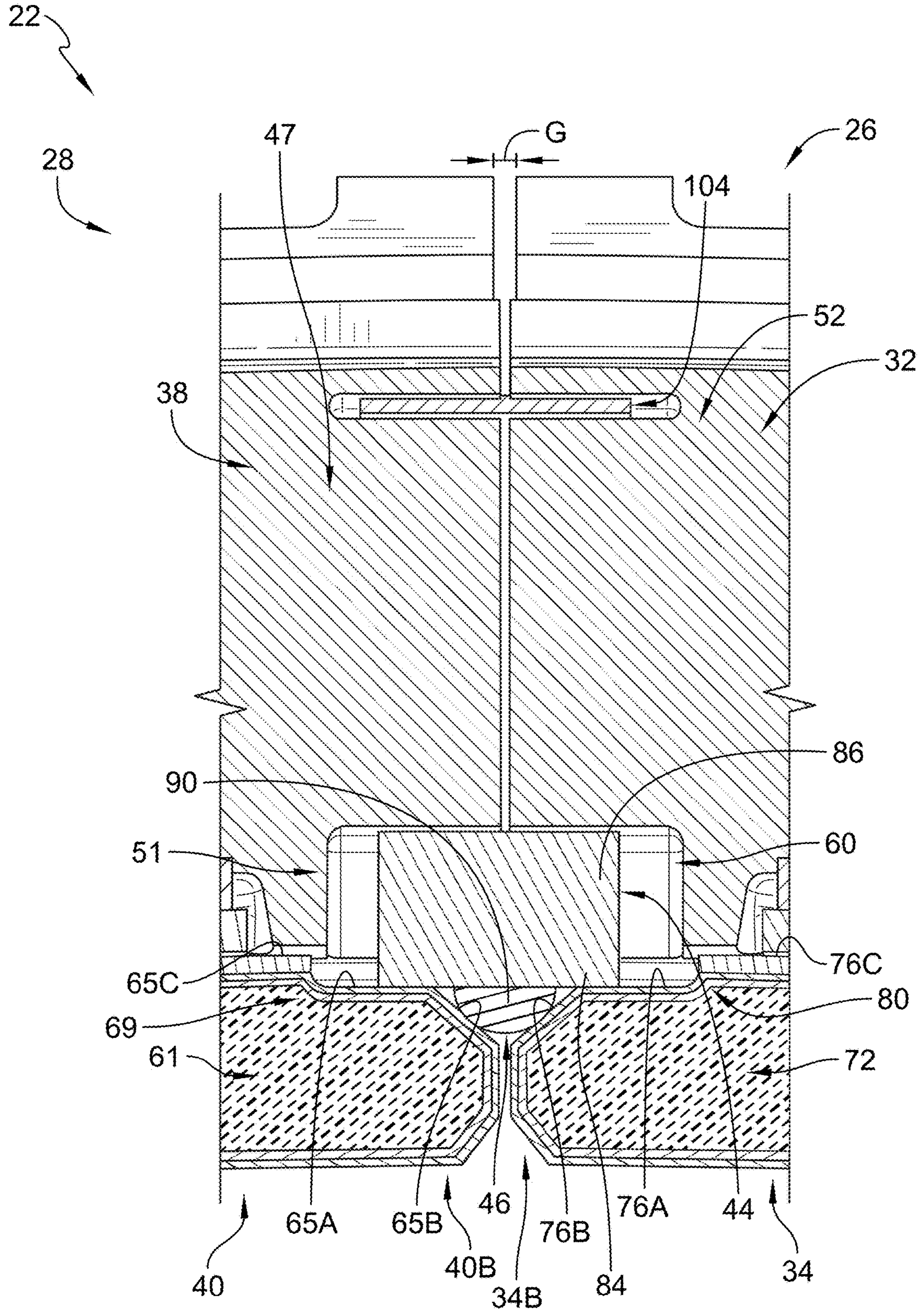
FIG. 7 is a cross-sectional view through the first and second shroud segments as assembled in the turbine shroud assembly of FIG. 1 showing that the first shroud segment and the second shroud segment are assembled adjacent one another and the first radial segment of the first seal extends circumferentially between the first shroud segment and the second shroud segment and radially outward into the first carrier segment and the second carrier segment, and further showing that the second seal is located radially inward of the first seal and the axial segment of the second seal extends axially along the first chamfered edge of the first shroud wall and a second chamfered edge of the second shroud wall.

The second shroud segment 28 is arranged circumferentially adjacent the first shroud segment 26 about the central axis 11. A circumferential gap G is formed between the first shroud segment 26 and the second shroud segment 28 as shown in FIG. 7. Though the turbine shroud assembly 22 is shown and described as having two shroud segments 26, 28 and a plurality of seals 30, the turbine shroud assembly 22 includes additional shroud segments and pluralities of seals so that the turbine shroud assembly 22 extends entirely circumferentially about the central axis 11 as suggested in FIG. 1.

The first shroud segment 26 includes a first carrier segment 32, a first blade track segment 34, and a first retainer 36 as shown in FIGS. 3 and 4. The first carrier segment 32 is arranged circumferentially at least partway around the central axis 11 and is coupled with the outer case 17 with hook features in the illustrative embodiment. The first blade track segment 34 is supported by the first carrier segment 32 to define a first portion of the gas path 25. The first retainer 36 extends axially through the first carrier segment 32 and the first blade track segment 34 to couple the first carrier segment 32 and the first blade track segment 34 together.

The second shroud segment 28 includes a second carrier segment 38, a second blade track segment 40, and a second retainer 42 as shown in FIG. 5. The second carrier segment 38 is arranged circumferentially at least partway around the central axis 11 and is coupled with the outer case 17 with hook features in the illustrative embodiment. The second blade track segment 40 is supported by the second carrier segment 38 to define a second portion of the gas path 25. The second retainer 42 extends axially through the second carrier segment 38 and the second blade track segment 40 to couple the second carrier segment 38 and the second blade track segment 40 together.

The plurality of seals 30 extends circumferentially into the first shroud segment 26 and the second shroud segment 28 as shown in FIG. 7 and as suggested in FIG. 5. The plurality of seals 30, along with the other strip seals 102, 104, 106, 108, 110, blocks gases in the gas path 25 from escaping the gas path 25 radially outward and circumferentially between the first shroud segment 26 and the second shroud segment 28 through the circumferential gap G.

Degradation and fluttering of strip seals may be a concern in turbine shroud assemblies. To minimize degradation of the first seal 44, the second seal 46 is located radially inward of the first seal 44 to protect the first seal 44 from heat of the gases in the gas path 25. Further, to minimize fluttering, and thus, reduce the possibility of failure of the first seal 44, the damping segment 48 engages the first seal 44 and the carrier segments 32, 38 to urge the first seal 44 radially inwardly against the blade track segments 34, 40 so that any flutter or vibration is dampened. In an event in which the second seal 46 degrades or fails, the first seal 44 blocks gases in the gas path 25 from escaping the gas path 25 radially outward and circumferentially between the first shroud segment 26 and the second shroud segment 28.

Turning back to the first shroud segment 26, the first carrier segment 32 of the first shroud segment 26 includes a first outer wall 50, a first flange 52, and a second flange 54 as shown in FIG. 3. The first flange 52 extends radially inward from the first outer wall 50. The second flange 54 is axially spaced apart from the first flange 52 and extends radially inward from the first outer wall 50. The first flange 52 is formed to include a first slot 60 as shown in FIG. 3. The first slot 60 extends circumferentially into the first flange 52 and is shaped to receive a portion of the first seal 44 therein.

The first flange 52 of the first carrier segment 32 includes a first wall 62 formed to include a radially inward facing surface 64 as shown in FIG. 3. The first slot 60 extends radially outward into the first flange 52 from the radially inward facing surface 64. A first protrusion 66 extends radially inward from the first wall 62 axially forward of the first slot 60. The first protrusion 66 is located axially forward of the first blade track segment 34 to cover an axial forward end 34A of the first blade track segment 34. The first protrusion 66 blocks at least a portion of the gases flowing through the gas path 25 from flowing axially into the first seal 44 and the second seal 46. The second flange 54 is formed to include a second slot 78 that extends radially outward into the second flange 54 as shown in FIG. 3. The second slot 78 extends circumferentially into the second flange 54 and is shaped to receive another portion of the first seal 44 therein.

The first carrier segment 32 further includes a third flange 56 and a fourth flange 58 as shown in FIG. 3. Each of the third flange 56 and the fourth flange 58 extends radially inward from the first outer wall 50. The third flange 56 is located axially between the first flange 52 and the fourth flange 58. The fourth flange 58 is located axially between the third flange 56 and the second flange 54. The third flange 56 of the first carrier segment 32 is formed to include a third slot 68 as shown in FIG. 3. The third slot 68 extends radially outward into the third flange 56 to receive a portion of the damping segment 48 therein. The fourth flange 58 of the first carrier segment 32 is formed to include a fourth slot 70 that extends radially outward into the fourth flange 58. The fourth slot 70 receives another portion of the damping segment 48 therein. Each of the flanges 52, 54, 56, and 58 of the first carrier segment 32 is formed to include a hole that receives the first retainer 36 therein as shown in FIGS. 3 and 4. Illustratively, the first carrier segment 32 is made of metallic materials.

The first blade track segment 34 includes a first shroud wall 72 and a first attachment feature 74 that extends radially outward from the first shroud wall 72 as shown in FIGS. 3 and 4. The first shroud wall 72 extends circumferentially partway around the central axis 11. The first shroud wall 72 has a first radial outer surface 76 that faces toward the first carrier segment 32 and a first radial inner surface 67 opposite the first radial outer surface 76 that faces toward the gas path 25. Illustratively, the first attachment feature 74 includes a first attachment flange 74A and a second attachment flange 74B axially aft of the first attachment flange 74A. Each of the attachment flanges 74A, 74B is formed to include a hole that receives the first retainer 36 therein. The first attachment flange 74A is located axially between the first flange 52 and the third flange 56 as shown in FIG. 3. The second attachment flange 74B is located axially between the fourth flange 58 and the second flange 54. Illustratively, the first blade track segment 34 is made of ceramic matrix composite materials.

The first radial outer surface 76 of the first shroud wall 72 includes a first portion 76A, a second portion 76B, and a third portion 76C as shown in FIGS. 3, 5, and 7. The second portion 76B extends radially inward and circumferentially away from the first portion 76A to provide a first chamfered edge of the first shroud wall 72. The second portion 76B defines a circumferential end 34B of the first shroud wall 72 that confronts the second blade track segment 40 as shown in FIG. 7. The third portion 76C extends circumferentially away from the first portion 76A to locate the first portion 76A circumferentially between the second portion 76B and the third portion 76C. The third portion 76C is radially spaced apart from the first portion 76A such that the third portion 76C is located radially outward of the first portion 76A. The first shroud wall 72 is formed with a first recess 80 that defines the first portion 76A and the third portion 76C of the first radial outer surface 76 of the first shroud wall 72.

The first radial outer surface 76 is exposed to air located radially between the first carrier segment 32 and the first blade track segment 34. The first seal 44 of the plurality of seals 30 is located on the first portion 76A of the first radial outer surface 76, and the second seal 46 is located on the second portion 76B of the first radial outer surface 76 as shown in FIG. 7.

In the illustrative embodiment, the first retainer 36 includes a mount pin 37 and a mount plug 39 as shown in FIG. 4. The first retainer 36 couples the first blade track segment 34 to the first carrier segment 32 as shown in FIGS. 3 and 4. The mount pin 37 extends through the first blade track segment 34 and into the first carrier segment 32. The mount plug 39 fits into the first carrier segment 32 axially aft of the mount pin 37 and circumferentially aligned with the mount pin 37. In the illustrative embodiment, the mount pin 37 includes a forward pin 41 and an aft pin 43 as shown in FIG. 4. The forward pin 41 and the aft pin 43 of the mount pin 37 are circumferentially aligned with one another. In this embodiment, the forward pin 41 is separate from the aft pin 43 so as to allow for independent loading during use in the gas turbine engine 10. In some embodiments, the mount pin 37 is formed as a single pin. Though not shown, in the illustrative embodiment, an additional first retainer is included in the first shroud segment 26 spaced apart circumferentially from the first retainer 36 such that the first shroud segment 26 includes two forward pins 41, two aft pins 43, and two mount plugs 39.

The second carrier segment 38 of the second shroud segment 28 includes a second outer wall 45, a fifth flange 47, and a sixth flange 49 as shown in FIG. 5. The fifth flange 47 extends radially inward from the second outer wall 45. The sixth flange 49 is axially spaced apart from the fifth flange 47 and extends radially inward from the second outer wall 45. The fifth flange 47 is formed to include a fifth slot 51 as shown in FIG. 5. The fifth slot 51 extends radially outward into the fifth flange 47 to receive a portion of the first seal 44 therein. The first slot 60 and the fifth slot 51 are aligned with one another while the first shroud segment 26 and the second shroud segment 28 are assembled adjacent one another. The sixth flange 49 is formed to include a sixth slot 79 that extends radially outward into the sixth flange 49 to receive another portion of the first seal 44 therein.

The second carrier segment 38 further includes a seventh flange 53 and an eighth flange 55 as shown in FIG. 5. Each of the seventh flange 53 and the eighth flange 55 extend radially inward from the second outer wall 45. The seventh flange 53 is located axially between the fifth flange 47 and the eighth flange 55. The eighth flange 55 is located axially between the seventh flange 53 and the sixth flange 49. The seventh and eighth flanges 53, 55 may be inner flanges or clevises that are both located axially inward of the fifth flange 47 and the sixth flange 49.

The seventh flange 53 of the second carrier segment 38 is formed to include a seventh slot 57 as shown in FIG. 7. The seventh slot 57 extends radially outward into the seventh flange 53. The eighth flange 55 of the second carrier segment 38 is formed to include an eighth slot 59 that extends radially outward into the eighth flange 55. The third slot 68 of the first carrier segment 32 and the seventh slot 57 of the second carrier segment 38 are aligned with one another while the first shroud segment 26 and the second shroud segment 28 are assembled adjacent to one another to receive a portion of the damping segment 48 therein. The fourth slot 70 of the first carrier segment 32 and the eighth slot 59 of the second carrier segment 38 are aligned with one another while the first shroud segment 26 and the second shroud segment 28 are assembled adjacent to one another to receive another portion of the damping segment 48 therein. Each of the flanges 47, 49, 53, and 55 of the second carrier segment 38 is formed to include a hole that receives the second retainer 42 therein.

The second blade track segment 40 includes a second shroud wall 61 and a second attachment feature 63 that extends radially outward from the second shroud wall 61 as shown in FIG. 5. The second shroud wall 61 extends circumferentially partway around the central axis 11. The second shroud wall 61 has a second radial outer surface 65 that faces toward the second carrier segment 38 and a second radial inner surface 81 opposite the second radial outer surface 65 that faces toward the gas path 25.

Illustratively, the second attachment feature 63 includes a third attachment flange 63A and a fourth attachment flange 63B axially aft of the third attachment flange 63A. Each of the attachment flanges 63A, 63B is formed to include a hole that receives the second retainer 42 therein. The third attachment flange 63A is located axially between the fifth flange 47 and the seventh flange 53. The fourth attachment flange 63B is located axially between the eighth flange 55 and the sixth flange 49. Illustratively, the second blade track segment 40 is made of ceramic matrix composite materials.

The second radial outer surface 65 of the second shroud wall 61 includes a first portion 65A, a second portion 65B, and a third portion 65C as shown in FIGS. 5 and 7. The second portion 65B extends radially inward and circumferentially away from the first portion 65A to provide a second chamfered edge of the second shroud wall 61. The second portion 65B defines a circumferential end 40B of the second shroud wall 61 that confronts the first blade track segment 34 as shown in FIG. 7. The third portion 65C extends circumferentially away from the first portion 65A to locate the first portion 65A circumferentially between the second portion 65B and the third portion 65C. The third portion 65C is radially spaced apart from the first portion 65A such that the third portion 65C is located radially outward of the first portion 65A. The second shroud wall 61 is formed with a second recess 69 that defines the first portion 65A and the third portion 65C of the second radial outer surface 65 of the second shroud wall 61.

The second radial outer surface 65 is exposed to air located radially between the second carrier segment 38 and the second blade track segment 40. The first seal 44 of the plurality of seals 30 is located on the first portion 65A of the second radial outer surface 65, and the second seal 46 is located on the second portion 65B of the second radial outer surface 65 as shown in FIG. 7. The second retainer 42 is the same as the first retainer 36 such that description of the first retainer 36 also applies to the second retainer 42.

The plurality of seals 30 includes the first seal 44, the second seal 46, and the damping segment 48 shown in FIG. 3. The first seal 44, which may also be referred to as a first strip seal 44, extends between the first blade track segment 34 and the second blade track segment 40 to block the gases from passing radially between and beyond the first shroud wall 72 and the second shroud wall 61 as shown in FIG. 7. The second seal 46, which may also be referred to as a rod seal 46, is located radially inward of the first seal 44 and extends between the first blade track segment 34 and the second blade track segment 40. The damping segment 48 is located radially outward of the first seal 44 and extends into the first carrier segment 32 and the second carrier segment 38.

Figure 6:
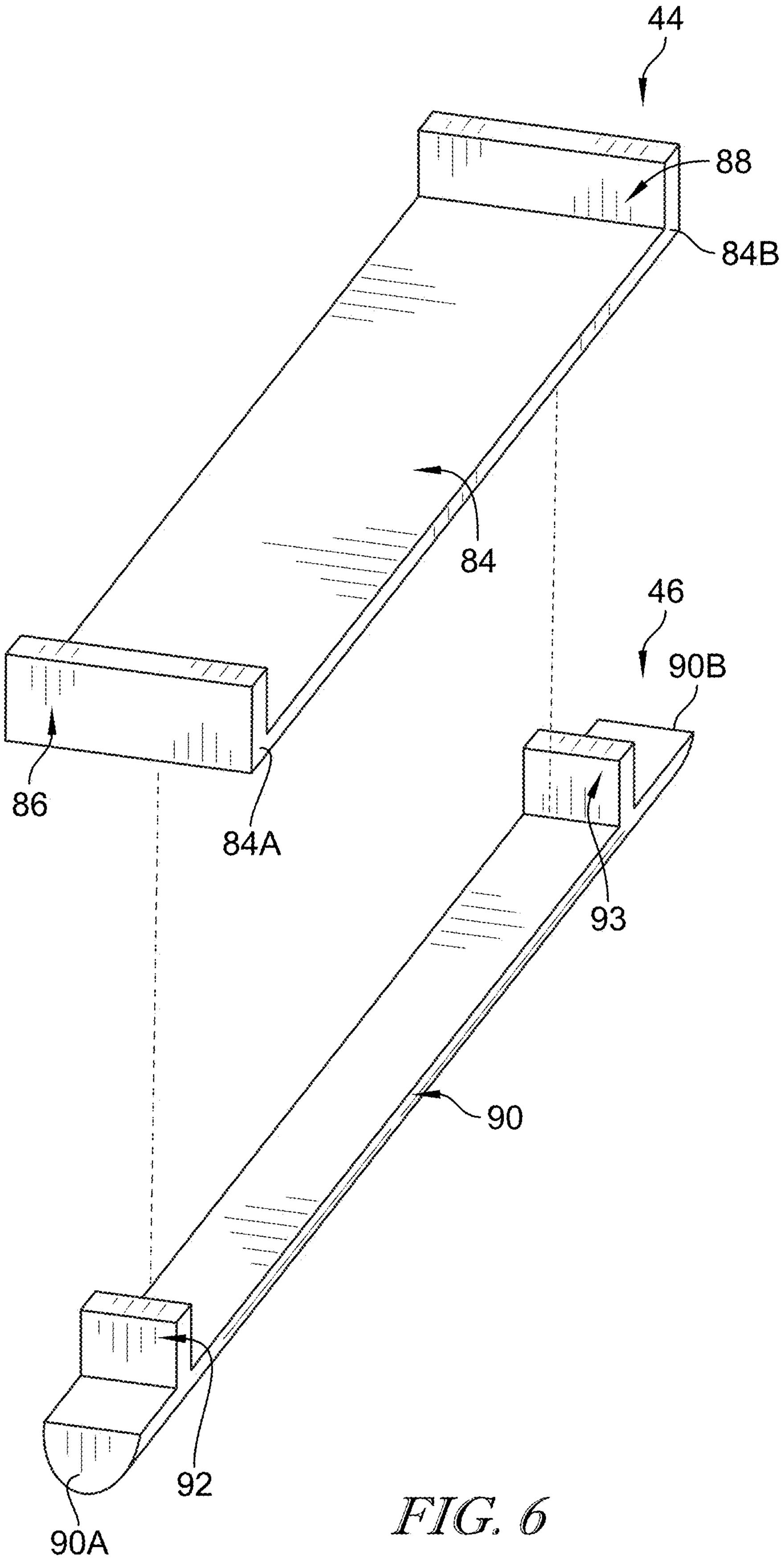
FIG. 6 is an exploded view of the first seal and the second seal of FIG. 3 showing that the first seal includes a body segment that extends between a first end and a second end thereof opposite the first end, a first radial segment extending radially outward from the first end of the body segment, and a second radial segment extending radially outward from the second end of the body segment, and further showing that the second seal includes an axial segment that extends axially between a first end and a second end thereof opposite the first end, a forward radial segment that extends radially outward from the axial segment, and an aft radial segment that extends radially outward from the axial segment, and further suggesting that, once assembled, the first seal is located axially between the forward radial segment and the aft radial segment of the second seal.

The first seal 44 extends axially along the first portion 76A of the first radial outer surface 76 of the first shroud wall 72 and the first portion 65A of the second radial outer surface 65 of the second shroud wall 61 to block the gases from passing radially between and beyond the first shroud wall 72 and the second shroud wall 61 as shown in FIG. 7. The first seal 44 includes a body segment 84, a first radial segment 86, and a second radial segment 88 as shown in FIGS. 3 and 6. The body segment 84 extends axially along the first portion 76A of the first radial outer surface 76 and the first portion 65A of the second radial outer surface 65 between a first end 84A and a second end 84B thereof opposite the first end 84A. The first radial segment 86 is coupled to the first end 84A of the body segment 84 and extends radially outward from the first end 84A of the body segment 84 into the first slot 60 formed in the first flange 52 of the first carrier segment 32 and the fifth slot 51 formed in the fifth flange 47 of the second carrier segment 38. The first radial segment 86 extending into the slots 60, 51 retains the body segment 84 axially relative to the shroud segments 26, 28 so that the body segment 84 does not move fore and aft.

The second radial segment 88 of the first seal 44 is coupled to the second end 84B of the body segment 84 as shown in FIGS. 3 and 6. The second radial segment 88 extends radially outward from the second end 84B of the body segment 84 into the second slot 78 formed in the second flange 54 of the first carrier segment 32 and the sixth slot 79 formed in the sixth flange 49 of the second carrier segment 38. The second radial segment 88 extending into the slots 78, 79 retains the body segment 84 axially relative to the shroud segments 26, 28 so that the body segment 84 does not move fore and aft.

Illustratively, the body segment 84, the first radial segment 86, and the second radial segment 88 all extend along a straight path. In some embodiments, the first radial segment 86 and the second radial segment 88 are each perpendicular to the body segment 84. A radial inner surface of the body segment 84 directly contacts the first portions 76A, 65A of the radial outer surfaces 76, 65 of the shroud walls 72, 61 as shown in FIG. 7. A radial outer surface of the body segment 84 is exposed to air that is radially between the carrier segments 32, 38 and the blade track segments 34, 40.

The first recess 80 of the first blade track segment 34 and the second recess 69 of the second blade track segment 40 retain the body segment 84 of the first seal 44 circumferentially between the first blade track segment 34 and the second blade track segment 40 as shown in FIG. 7. The body segment 84 may move circumferentially a marginal amount, however, the recesses 80, 69 block the body segment 84 from moving such that the circumferential gap G is no longer blocked.

The second seal 46 is located radially inward of the first seal 44 as shown in FIG. 3. The second seal 46 extends axially along the second portion 76B of the first radial outer surface 76 of the first shroud wall 72 and the second portion 65B of the second radial outer surface 65 of the second shroud wall 61. Because the second seal 46 is located radially inward of the first seal 44, the second seal 46 provides a heat shield for the first seal 44 to protect the first seal 44 from heat of the gases in the gas path 25. The second seal 46 acts as the primary seal, and in the event of degradation or failure of the second seal 46, the first seal 44 acts as the primary seal.

The second seal 46 includes an axial segment 90, a forward radial segment 92, and an aft radial segment 93 as shown in FIGS. 3 and 6. The axial segment 90 extends axially between a first end 90A and a second end 90B thereof opposite the first end 90A. The forward radial segment 92 is coupled with the axial segment 90 to extend radially outward from the axial segment 90 toward the first carrier segment 32 and the second carrier segment 38. The aft radial segment 93 is coupled with the axial segment 90 to extend radially outward from the axial segment 90 toward the first carrier segment 32 and the second carrier segment 38. The aft radial segment 93 is spaced apart axially aft from the forward radial segment 92. Illustratively, the forward radial segment 92, the aft radial segment 93, and the axial segment 90 all extend along straight paths, and the forward radial segment 92 and the aft radial segment 93 are both perpendicular to the axial segment 90. The axial segment 90 extends axially along the second portions 76B, 65B (i.e., the chamfered edges) of the radial outer surfaces 76, 65 of the shroud walls 72, 61 as shown in FIG. 7. Illustratively, the axial segment 90 has a semi-circle shaped cross-section when viewed axially as shown in FIG. 7.

The forward radial segment 92 is coupled with the axial segment 90 axially aft of the first end 90A of the axial segment 90 as shown in FIG. 6. In other words, the forward radial segment 92 is spaced apart axially aft from the first end 90A of the axial segment 90. In some embodiments, the forward radial segment 92 extends radially outward from the first end 90A of the axial segment 90. In some embodiments, the forward radial segment 92 is omitted. The aft radial segment 93 is coupled with the axial segment 90 axially aft of the forward radial segment 92 and axially forward of the second end 90B of the axial segment 90. In other words, the aft radial segment 93 is spaced apart axially forward from the second end 90B of the axial segment 90. In some embodiments, the aft radial segment 93 extends radially outward from the second end 90B of the axial segment 90. In some embodiments, the aft radial segment 93 is omitted.

The first seal 44 is located axially between the forward radial segment 92 and the aft radial segment 93 as shown in FIG. 3 and as suggested in FIG. 6. The forward radial segment 92 of the second seal 46 is located axially forward of and abuts the first radial segment 86 of the first seal 44. The aft radial segment 93 of the second seal 46 is located axially aft of and abuts the second radial segment 88 of the first seal 44.

Because the first radial segment 86 and the second radial segment 88 of the first seal 44 extend radially outward into the slots 60, 78, 51, 79 formed in the carrier segments 32, 38, the first seal 44 is blocked from axial movement. Further, because the forward radial segment 92 of the second seal 46 abuts the first radial segment 86 of the first seal 44 and the aft radial segment 93 of the second seal 46 abuts the second radial segment 88 of the first seal 44, the second seal 46 is blocked from axial movement due to the engagement with the first seal 44.

The damping segment 48 engages each of the first seal 44, the first carrier segment 32, and the second carrier segment 38 to urge the first seal 44 radially inward against the first portion 76A of the first radial outer surface 76 of the first shroud wall 72, the first portion 65A of the second radial outer surface 65 of the second shroud wall 61, and the axial segment 90 of the second seal 46. The damping segment 48 extends along a curvilinear path as shown in FIG. 3. In the illustrative embodiment, the curvilinear path forms a w-shape. The damping segment 48 is defined by a first radially-extending portion 96, a second radially-extending portion 98, and a curved intermediate portion 99 that extends between and interconnects the first radially-extending portion 96 and the second radially-extending portion 98. The first radially-extending portion 96 forms the forward-most end of the damping segment 48, and the second radially-extending portion 98 forms the aft-most end of the damping segment 48. The curved intermediate portion 99 extends between a forward end 99A and an aft end 99B thereof. The first radially-extending portion 96 extends axially forward and radially outward from the forward end 99A of the curved intermediate portion 99 and into the third slot 68 formed in the third flange 56 of the first carrier segment 32 and into the seventh slot 57 formed in the seventh flange 53 of the second carrier segment 38. The second radially-extending portion 98 extends axially aft and radially outward from the aft end 99B of the curved intermediate portion 99 and into the fourth slot 70 formed in the fourth flange 58 of the first carrier segment 32 and the eighth slot 59 formed in the eighth flange 55 of the second carrier segment 38. The curved intermediate portion 99, from the forward end 99A thereof, extends radially outward and axially aft to a peak 99C as shown in FIG. 3. From the peak 99C, the curved intermediate portion 99 extends radially inward and axially aft to the aft end 99B thereof. The peak 99C is located axially between the third flange 56 and the fourth flange 58 of the first carrier segment 32. The forward end 99A and the aft end 99B of the curved intermediate portion 99 each engage a radial outer surface of the body segment 84 of the first seal 44 as shown in FIG. 3. In some embodiments, the damping segment 48 is formed as a coil.

The engagement between the first radially-extending portion 96 and the third slot 68 and the second radially-extending portion 98 and the fourth slot 70 applies a force to the body segment 84 of the first seal 44 as suggested in FIG. 3. The force urges the body segment 84 of the first seal 44 radially inward against the shroud walls 72, 61 and against the second seal 46. The urging of the body segment 84 of the first seal 44 against the shroud walls 72, 61 dampens flutter movement of the first seal 44 relative to the first blade track segment 34 and the second blade track segment 40 during use of the turbine shroud assembly 22. The urging of the body segment 84 of the first seal 44 against the second seal 46 urges the second seal 46 radially inward against the chamfered edges of the shroud walls 72, 61.

In some embodiments, the turbine shroud assembly 22 further includes strip seals 102, 104, 106, 108, 110 as shown in FIGS. 3 and 5. Each of the strip seals 102, 104, 106, 108 extends into the first carrier segment 32 and the second carrier segment 38. The strip seal 110 extends into each of the second attachment flange 74B of the first blade track segment 34 and the fourth attachment flange 63B of the second blade track segment 40. The first carrier segment 32 and the second carrier segment 38 are each formed to include grooves sized to receive the strip seals 102, 104, 106, 108 therein as shown in FIGS. 3 and 5. The second attachment flange 74B of the first blade track segment 34 and the fourth attachment flange 63B of the second blade track segment 40 are each formed to include a groove sized to receive the strip seal 110 therein. The strip seals 102, 104, 106, 108, 110 provide additional sealing between the first shroud segment 26 and the second shroud segment 28.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a first portion of a gas path of the turbine shroud assembly, the first blade track segment having a first shroud wall that extends circumferentially partway around the central axis and a first attachment feature that extends radially outward from the first shroud wall, wherein the first shroud wall has a first radial outer surface and a first radial inner surface, and the first radial outer surface includes a first portion and a second portion that extends radially inward and circumferentially away from the first portion to provide a first chamfered edge of the first shroud wall, a second shroud segment arranged circumferentially adjacent the first shroud segment about the central axis, the second shroud segment including a second carrier segment arranged circumferentially at least partway around the central axis and a second blade track segment supported by the second carrier segment to define a second portion of the gas path of the turbine shroud assembly, the second blade track segment having a second shroud wall that extends circumferentially partway around the central axis and a second attachment feature that extends radially outward from the second shroud wall, wherein the second shroud wall has a second radial outer surface and a second radial inner surface, and the second radial outer surface includes a first portion and a second portion that extends radially inwardly and circumferentially away from the first portion of the second radial outer surface to provide a second chamfered edge of the second shroud wall, and a plurality of seals extending circumferentially into the first shroud segment and the second shroud segment to block gases from escaping the gas path radially between the first shroud segment and the second shroud segment, the plurality of seals including a strip seal and a rod seal, the strip seal extends axially along the first portion of the first radial outer surface of the first shroud wall and the first portion of the second radial outer surface of the second shroud wall, and the rod seal is located radially inward of the strip seal and extends axially along the second portion of the first radial outer surface of the first shroud wall and the second portion of the second radial outer surface of the second shroud wall to block the gases from passing radially between and beyond the first shroud wall and the second shroud wall, wherein the rod seal includes an axial segment that extends axially between a first end and a second end thereof opposite the first end, a forward radial segment that extends radially outward from the axial segment and is spaced apart from the first end of the axial segment, and an aft radial segment that extends radially outward from the axial segment and is spaced apart from the forward radial segment and the second end of the axial segment, and wherein the strip seal is located axially between the forward radial segment and the aft radial segment such that the rod seal is blocked from axial movement due to engagement of at least one of the forward radial segment and the aft radial segment with the strip seal.

2. The turbine shroud assembly of claim 1, wherein the first carrier segment includes a first outer wall, a first flange that extends radially inward from the first outer wall, a second flange axially spaced apart from the first flange that extends radially inward from the first outer wall, a third flange that extends radially inward from the first outer wall and is located axially between the first flange and the second flange, and a fourth flange that extends radially inward from the first outer wall and is located axially between the third flange and the second flange.

3. The turbine shroud assembly of claim 2, wherein the plurality of seals includes a damping segment that engages each of the strip seal, the first carrier segment, and the second carrier segment to urge the strip seal radially inward against the first shroud wall and the second shroud wall, and wherein the damping segment is formed to include a first radially-extending portion at a forward end of the damping segment and a second radially-extending portion at an aft end of the damping segment, the first radially-extending portion extends into a first slot formed in the third flange to engage the third flange and the second radially-extending portion extends into a second slot formed in the fourth flange to engage the fourth flange.

4. The turbine shroud assembly of claim 3, wherein the damping segment is w-shaped and includes a curved intermediate portion that extends between and interconnects the first radially-extending portion and the second radially-extending portion.

5. The turbine shroud assembly of claim 2, wherein the strip seal includes a body segment that extends axially along the first portion of the first radial outer surface of the first shroud wall and the first portion of the second radial outer surface of the second shroud wall between a first end of the body segment and a second end thereof opposite the first end, a first radial segment coupled to the first end of the body segment and extending radially outward from the first end of the body segment into the first flange of the first carrier segment, and a second radial segment coupled to the second end of the body segment and extending radially outward from the second end of the body segment into the second flange of the first carrier segment.

6. The turbine shroud assembly of claim 1, wherein the first radial outer surface of the first shroud wall includes a third portion that extends circumferentially away from the first portion of the first radial outer surface to locate the first portion of the first radial outer surface circumferentially between the second portion of the first radial outer surface and the third portion of the first radial outer surface, and the third portion of the first radial outer surface is radially spaced apart from the first portion of the first radial outer surface, and wherein the second radial outer surface of the second shroud wall includes a third portion that extends circumferentially away from the first portion of the second radial outer surface to locate the first portion of the second radial outer surface circumferentially between the second portion of the second radial outer surface and the third portion of the second radial outer surface, and the third portion of the second radial outer surface is radially spaced apart from the first portion of the second radial outer surface.

7. The turbine shroud assembly of claim 1, wherein the axial segment has a semi-circle shaped cross-section when viewed axially.

8. The turbine shroud assembly of claim 1, wherein the forward radial segment is coupled with the axial segment axially aft of the first end of the axial segment, and wherein the aft radial segment is coupled with the axial segment axially aft of the forward radial segment and axially forward of the second end of the axial segment.

9. The turbine shroud assembly of claim 1, wherein the strip seal includes a body segment that extends axially along the first portion of the first radial outer surface of the first shroud wall and the first portion of the second radial outer surface of the second shroud wall between a first end of the body segment and a second end thereof opposite the first end, a first radial segment coupled to the first end of the body segment and extending radially outward from the first end of the body segment into the first carrier segment, and a second radial segment coupled to the second end of the body segment and extending radially outward from the second end of the body segment into the first carrier segment.

10. The turbine shroud assembly of claim 9, wherein the forward radial segment of the rod seal abuts the first radial segment of the strip seal and the aft radial segment of the rod seal abuts the second radial segment of the strip seal such that the first radial segment and the second radial segment of the strip seal cooperate to axially locate the rod seal.

11. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a first portion of a gas path of the turbine shroud assembly, the first blade track segment having a first shroud wall that extends circumferentially partway around the central axis and a first attachment feature that extends radially outward from the first shroud wall, a second shroud segment arranged circumferentially adjacent the first shroud segment about the central axis, the second shroud segment including a second carrier segment arranged circumferentially at least partway around the central axis and a second blade track segment supported by the second carrier segment to define a second portion of the gas path of the turbine shroud assembly, the second blade track segment having a second shroud wall that extends circumferentially partway around the central axis and a second attachment feature that extends radially outward from the second shroud wall, and a plurality of seals extending circumferentially into the first shroud segment and the second shroud segment, the plurality of seals including a first seal, a second seal, and a damping segment, the first seal extends axially along the first shroud wall and the second shroud wall, the second seal is located radially inward of the first seal and extends axially along the first shroud wall and the second shroud wall, and the damping segment is located radially outward of the first seal and engages the first seal, the first carrier segment, and the second carrier segment.

12. The turbine shroud assembly of claim 11, wherein the second seal includes an axial segment that extends axially between a first end and a second end thereof opposite the first end, and wherein the axial segment has a semi-circle shaped cross-section when viewed axially.

13. The turbine shroud assembly of claim 11, wherein the first seal includes a body segment that extends axially along the first shroud wall and the second shroud wall between a first end of the body segment and a second end thereof opposite the first end, a first radial segment coupled to the first end of the body segment and extending radially outward from the first end of the body segment into the first carrier segment, and a second radial segment coupled to the second end of the body segment and extending radially outward from the second end of the body segment into the first carrier segment.

14. The turbine shroud assembly of claim 11, wherein the first carrier segment includes a first outer wall, a first flange that extends radially inward from the first outer wall, a second flange axially spaced apart from the first flange that extends radially inward from the first outer wall, a third flange that extends radially inward from the first outer wall and is located axially between the first flange and the second flange, and a fourth flange that extends radially inward from the first outer wall and is located axially between the third flange and the second flange, and wherein the damping segment is formed to include a first radially-extending portion at a forward end of the damping segment and a second radially-extending portion at an aft end of the damping segment, the first radially-extending portion extends into a first slot formed in the third flange to engage the third flange and the second radially-extending portion extends into a second slot formed in the fourth flange to engage the fourth flange.

15. The turbine shroud assembly of claim 14, wherein the first seal includes a body segment that extends axially along the first shroud wall and the second shroud wall between a first end of the body segment and a second end thereof opposite the first end, a first radial segment coupled to the first end of the body segment and extending radially outward from the first end of the body segment into the first flange of the first carrier segment, and a second radial segment coupled to the second end of the body segment and extending radially outward from the second end of the body segment into the second flange of the first carrier segment, and wherein the damping segment engages the body segment of the first seal.

16. A method of assembling a turbine shroud assembly for use with a gas turbine engine comprising:

assembling a first shroud segment by coupling a first blade track segment with a first carrier segment to support the first blade track segment radially inward of the first carrier segment, the first blade track segment having a first shroud wall and a first attachment feature that extends radially outward from the first shroud wall, wherein the first shroud wall has a first radial outer surface that includes a first portion and a second portion that extends radially inward and circumferentially away from the first portion, assembling a second shroud segment by coupling a second blade track segment with a second carrier segment to support the second blade track segment radially inward of the second carrier segment, locating a strip seal on the first portion of the first radial outer surface of the first shroud wall, locating a damping segment on a radially outer surface of the strip seal so that the damping segment engages the strip seal and the first carrier segment, and locating a rod seal radially inward of the strip seal on the second portion of the first radial outer surface of the first shroud wall.

17. The method of claim 16, further comprising locating the strip seal axially between a forward radial segment of the rod seal and an aft radial segment of the rod seal so that the rod seal is blocked from axial movement relative to the strip seal.

18. The method of claim 16, further comprising urging the strip seal radially inward against the first portion of the first radial outer surface of the first shroud wall through engagement of the damping segment with the first carrier segment and urging the rod seal radially inward against the second portion of the first radial outer surface of the first shroud wall through engagement of the damping segment with the strip seal.

* * * * *